United States Patent
Krapf et al.

(10) Patent No.: US 8,670,844 B2
(45) Date of Patent: Mar. 11, 2014

(54) DEVICE, PARTICULARLY PROTECTIVE SENSOR SYSTEM, FOR A MACHINE TOOL

(75) Inventors: Reiner Krapf, Reutlingen (DE); Heiko Braun, Leinfelden-Echterdingen (DE); Michael Mahler, Lenfelden-Echterdingen (DE); Alexander Werner Hees, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 12/811,960

(22) PCT Filed: Nov. 11, 2008

(86) PCT No.: PCT/EP2008/065259
§ 371 (c)(1),
(2), (4) Date: Sep. 22, 2010

(87) PCT Pub. No.: WO2009/086968
PCT Pub. Date: Jul. 16, 2009

(65) Prior Publication Data
US 2011/0022188 A1    Jan. 27, 2011

(30) Foreign Application Priority Data
Jan. 11, 2008   (DE) .................. 10 2008 000 038

(51) Int. Cl.
*F16D 9/00* (2006.01)
*F16D 67/00* (2006.01)
*G05B 11/01* (2006.01)
*G05B 13/02* (2006.01)
*F16P 3/00* (2006.01)
*G05B 19/05* (2006.01)

(52) U.S. Cl.
CPC .. *F16P 3/00* (2013.01); *G05B 19/05* (2013.01)
USPC .................. 700/12; 700/13; 700/29; 700/30; 700/31; 83/76.6; 83/76.7; 318/364; 318/400.21; 192/129 R (58) Field of Classification Search
USPC ................. 700/12, 13, 29, 30, 31; 192/129 R
See application file for complete search history.

(56) References Cited

U.S. PATENT DOCUMENTS 3,785,230 A * 1/1974 Lokey .............................. 30/388
3,953,770 A * 4/1976 Hayashi ......................... 361/179

(Continued)

FOREIGN PATENT DOCUMENTS

| DE | 10 2007 041 664 | 4/2008 |
|---|---|---|
| EP | 1 422 022 | 5/2004 |
| WO | WO 2008/028871 | 3/2008 |

OTHER PUBLICATIONS

Knochel et al. "UWB-Sensors for Industrial Applications." *IEEE*. 2007. pp. 529-534.

(Continued)

*Primary Examiner* — Mohammad Ali
*Assistant Examiner* — Kelvin Booker
(74) *Attorney, Agent, or Firm* — Merchant & Gould P.C.

(57) ABSTRACT

The invention relates to a device, particularly a machine tool device, having at least one computer (10), at least one transmitter (12) for transmitting a transmission signal (S1, S2), at least one receiver (14) for receiving at least one receiving signal (E1, E2, E3, E4) excited by the transmission signal (S1, S2), and at least one analysis unit (16) which is provided to calculate at least one parameter (P1, P2, P3, P4) by means of the receiving signal (E1, E2, E3, E4). The invention provides that the computer unit (10) is provided to compare the parameter (P1, P2, P3, P4) to at least one comparison parameter (V1, V2, V3, V4) calculated by means of at least one model (M).

18 Claims, 4 Drawing Sheets

(56) References Cited

U.S. PATENT DOCUMENTS

| | | | | |
|---|---|---|---|---|
| 4,026,177 A * | 5/1977 | Lokey | | 83/835 |
| 4,075,961 A * | 2/1978 | Harris | | 112/277 |
| 4,470,046 A * | 9/1984 | Betsill | | 341/155 |
| 4,532,501 A * | 7/1985 | Hoffman | | 340/679 |
| 4,541,055 A * | 9/1985 | Wolfe et al. | | 700/166 |
| 5,191,636 A * | 3/1993 | Halperin | | 706/23 |
| 5,210,704 A * | 5/1993 | Husseiny | | 702/34 |
| 5,212,621 A * | 5/1993 | Panter | | 361/181 |
| 5,237,897 A * | 8/1993 | Wijesinghe et al. | | 83/72 |
| 5,241,885 A * | 9/1993 | Kuchler | | 83/76.7 |
| 5,307,916 A * | 5/1994 | Bentzien et al. | | 192/129 R |
| 6,120,367 A * | 9/2000 | Scott et al. | | 452/135 |
| 6,161,055 A * | 12/2000 | Pryor | | 700/175 |
| 6,192,283 B1 * | 2/2001 | Holowko | | 700/28 |
| 6,256,546 B1 * | 7/2001 | Graham et al. | | 700/30 |
| 6,370,480 B1 * | 4/2002 | Gupta et al. | | 702/39 |
| 6,376,939 B1 * | 4/2002 | Suzuki et al. | | 307/326 |
| 6,734,581 B1 * | 5/2004 | Griffis | | 307/125 |
| 6,826,988 B2 * | 12/2004 | Gass et al. | | 83/62.1 |
| 6,880,440 B2 * | 4/2005 | Gass et al. | | 83/62.1 |
| 6,931,973 B2 * | 8/2005 | Kuchler | | 83/13 |
| 6,961,636 B1 * | 11/2005 | Chong et al. | | 700/121 |
| 6,988,017 B2 * | 1/2006 | Pasadyn et al. | | 700/121 |
| 6,997,090 B2 * | 2/2006 | Gass et al. | | 83/58 |
| 7,000,514 B2 * | 2/2006 | Gass et al. | | 83/58 |
| 7,055,417 B1 * | 6/2006 | Gass | | 83/58 |
| 7,077,039 B2 * | 7/2006 | Gass et al. | | 83/13 |
| 7,173,537 B2 * | 2/2007 | Voigtlaender | | 340/585 |
| 7,210,383 B2 * | 5/2007 | Gass et al | | 83/58 |
| 7,231,856 B2 * | 6/2007 | Gass et al. | | 83/58 |
| 7,373,863 B2 * | 5/2008 | O'Banion et al. | | 83/63 |
| 7,421,315 B2 * | 9/2008 | Gass et al. | | 700/253 |
| 7,437,201 B2 * | 10/2008 | Cullen | | 700/29 |
| 7,495,782 B2 * | 2/2009 | Finarov et al. | | 356/625 |
| 7,536,237 B2 * | 5/2009 | Esterling | | 700/175 |
| 7,606,624 B2 * | 10/2009 | Cullen | | 700/29 |
| 7,644,645 B2 * | 1/2010 | Gass et al. | | 83/62.1 |
| 7,676,284 B2 * | 3/2010 | Birk et al. | | 700/31 |
| 7,725,206 B2 * | 5/2010 | Richey | | 700/98 |
| 7,791,740 B2 * | 9/2010 | Finarov et al. | | 356/625 |
| 7,827,889 B2 * | 11/2010 | Carrier | | 83/63 |
| 7,895,927 B2 * | 3/2011 | Gass | | 83/62.1 |
| 7,900,541 B2 * | 3/2011 | Gass et al. | | 83/62 |
| 8,079,292 B2 * | 12/2011 | Gass et al. | | 83/62 |
| 8,186,256 B2 * | 5/2012 | Carrier | | 83/63 |
| 8,191,450 B2 * | 6/2012 | Gass | | 83/62.1 |
| 8,196,499 B2 * | 6/2012 | Gass | | 83/62.1 |
| 8,214,188 B2 * | 7/2012 | Bailey et al. | | 703/10 |
| 8,291,797 B2 * | 10/2012 | Gass et al. | | 83/63 |
| 8,408,106 B2 * | 4/2013 | Gass | | 83/62.1 |
| 8,408,107 B2 * | 4/2013 | Carrier et al. | | 83/63 |
| 2003/0050735 A1 * | 3/2003 | Griffis | | 700/255 |
| 2003/0090224 A1 * | 5/2003 | Gass et al. | | 318/364 |
| 2004/0039465 A1 * | 2/2004 | Boyer et al. | | 700/95 |
| 2004/0226424 A1 * | 11/2004 | O'Banion et al. | | 83/397 |
| 2005/0145080 A1 * | 7/2005 | Voigtlaender | | 83/58 |
| 2006/0025897 A1 * | 2/2006 | Shostak et al. | | 701/1 |
| 2007/0085502 A1 * | 4/2007 | Graves | | 318/364 |
| 2008/0018276 A1 * | 1/2008 | Burema | | 318/365 |
| 2008/0078470 A1 * | 4/2008 | O'Branion et al. | | 144/356 |
| 2009/0000443 A1 * | 1/2009 | Gass et al. | | 83/62 |
| 2009/0021205 A1 * | 1/2009 | Cullen | | 318/561 |
| 2010/0036510 A1 * | 2/2010 | Cullen | | 700/37 |
| 2010/0088264 A1 * | 4/2010 | Teverovskiy et al. | | 706/46 |
| 2010/0106284 A1 | 4/2010 | Krapf et al. | | |
| 2010/0152905 A1 * | 6/2010 | Kusiak | | 700/276 |
| 2011/0079124 A1 * | 4/2011 | Carrier | | 83/63 |

OTHER PUBLICATIONS

ETSI.. "Object discrimination and characterization applications operating in the frequency band 2,2 GHz to 8 GHz." *ETSI Standards*. vol. DTRERM-RM, NR 044-2, No. v1.1.1. 2006.

* cited by examiner

DEVICE, PARTICULARLY PROTECTIVE SENSOR SYSTEM, FOR A MACHINE TOOL

This application is a National Stage Application of PCT/EP2008/065259, filed 11 Nov. 2008, which claims benefit of Serial No. 10 2008 000 038.8, filed 11 Jan. 2008 in Germany and which applications are incorporated herein by reference. To the extent appropriate, a claim of priority is made to each of the above disclosed applications.

BACKGROUND

The invention is based on a device according to the generic term of claim 1.

A device with an evaluation unit, which calculates a material parameter by means of a received signal, has already been suggested.

SUMMARY

The invention is based on a device, in particular a machine tool device, with at least one computer, at least one transmitter for transmitting at least one transmission signal, at least one receiver for receiving at least one receiving signal that has been excited by the transmission signal and at least one evaluation unit, which is provided to calculate at least one parameter at least by means of the receiving signal.

It is suggested that the computer is provided to compare the parameter with at least one comparison parameter that has been calculated with the aid of a model. According to the invention information about an object that has been examined by means of the transmission signal can be derived particularly precisely with the aid of the parameter. A "computer" provides in particular a processor and storage. The transmitter is particularly provided to send out an electromagnetic signal. The receiver is particularly provided to receive an electromagnetic signal. In particular the transmitter and the receiver can be identical. "Provided" shall in particular mean customized and/or construed and/or programmed. A "model" is in particular a system, which is used, selected and/or created by a third system for a certain task of essential characteristics in order to enable the detection, controlling and/or description of the original by the latter or to make it easier or replace it. The model is preferably based on an equation or a system of equations, which are derived from at least one physical law, which described a specific physical process. The model can in particular be an algorithm, which determines a numeric procedure for evaluating equations.

It is furthermore suggested that the parameter is a reflection variable or a transmission variable. Thereby information about an examined object can be obtained particularly easily in one quick evaluation process. A "reflection variable" is in particular a reflection factor or a reflection coefficient. Analogously a "transmission variable" is in particular a transmission factor or a transmission coefficient. The terms "reflection variable" and "transmission variable" are in particular known from the high frequency technology. The reflection factor or transmission factor and the reflection coefficient or transmission coefficient contain in particular information about an amplitude decrease of the transmission signal at a reflection or transmission. The reflection coefficient or the transmission coefficient contains furthermore information about a phase change, which the transmission signal can experience at a reflection at a surface or at a transmission. Reflection factors or transmission factors are in particular complex numbers.

The comparison parameter is preferably assigned to at least one characteristic vector of the model. Thereby information about a characteristic vector can be maintained with the aid of at least one signal evaluation. The comparison parameter is in particular assigned to a characteristic vector if the model calculates the comparison parameter by means of the characteristic vector. A "characteristic vector" is in particular an amount of characteristic variables which provides at least one characteristic variable. The characteristic variables can in particular be model parameter, which is for example varied at the model calculation and/or put in by a user, or results of a calculation that has been carried out with the aid of the model. Those characteristic variables represent in particular physical variables, which characterize the features of an examined object.

In a preferred embodiment of the invention the characteristic vector provides a thickness of a layer whose interactions with the transmission signal are described with the aid of the model. That way information for the geometry of the layer can be obtained.

Advantageously the characteristic vector comprises at least one di-electricity constant of a layer, whose interaction with the transmission signal is described with the aid of the model. Thereby information about the material of the layer can be obtained. An "interaction" of the transmission signal with the layer is in particular an at least partial reflection of the transmission signal or an at least partial transmission of the transmission signal.

It is furthermore suggested that the characteristic vector provides at least a number of layers which specifies the number of the layers of an object that is examined by means of the transmission signal, which is assumed in a calculation with the aid of the model. Thereby a big application area of the model can be achieved.

In a preferred embodiment of the invention the computer unit provides software, which is provided for calculating the comparison parameter with the aid of the model. Thereby the comparison parameter can be determined in a flexible way. "Software" shall in particular be understood as at least one program. A "program" shall in particular mean a collection of demands, which are provided for being carried out by at least one processor or a computer unit, and which are summarized as one unit and provided to fulfill at least one task.

Advantageously the software is provided, to determine a value of the comparison parameter, which realizes a minimal deviation of the comparison parameter from the parameter. Thereby an effective determination of an optimal comparison parameter can be achieved. A "minimal" deviation of the comparison parameter from the parameter is in particular minimal compared to further comparison parameters that are calculated by the model.

In a preferred embodiment of the invention the software is provided to distinguish at least two parameter areas due to a magnitude of error that has been calculated by means of the model. Thereby particularly precise information about a parameter can be obtained. A "magnitude of error" is in particular a range of values of a parameter of a characteristic vector, whereby the range of values can consist of a single number.

The transmission signal is preferably a high frequency signal, whereby the precision can be further increased. A "high frequency signal" is in particular a signal with a frequency of at least two gigahertz.

Furthermore a protective sensor system is suggested, which provides the device. A particularly reliable detection of human tissue can be achieved with it.

Additionally a procedure, in particular with the device, is suggested, whereby at least one transmission signal is transmitted, at least receiving signal that is excited by the transmission signal is received, a parameter is calculated at least by means of the receiving signal and the parameter is compared with at least one comparison parameter that is calculated by means of a model. According to the invention information about an object that has been examined by means of the transmission signal can be derived particularly precisely with the aid of the parameter.

BRIEF DESCRIPTION OF THE DRAWINGS

Further advantages arise from the following description of the drawing. The drawing shows embodiments of the invention. The drawing, the description and the claims contain several characteristics in combination. The expert will consider the characteristics also individually and summarize them to useful further combinations.

It is shown in.

DETAILED DESCRIPTION

Figure 1:
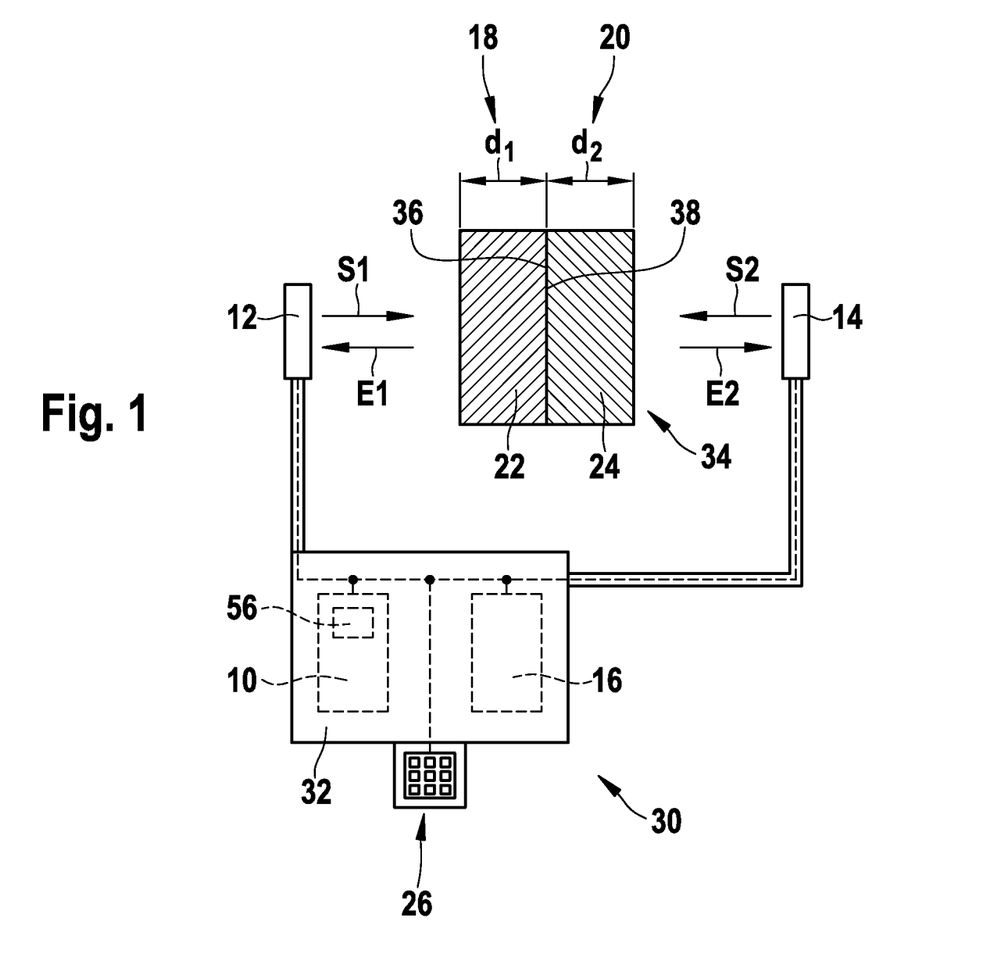
FIG. 1 a top view on a device with an object that has to be examined in a measuring position, FIG. 2 a schematic illustration of an analysis of the object by the device, FIG. 3 a diagram with measuring charts and FIG. 4 a machine tool with a circular saw and a protective sensor system, which provides the device.

FIG. 1 shows a schematic illustration of a device 30 that is construed as machine tool device with an object 34 in a measuring position that has to be examined. The device 30 provides a transmitter 12 and a receiver 14, which are both attached at a base body 32 of the device 30. The base body 32 comprises an analysis unit 16 and a computer unit 10, which provides a storage unit 56. In a first operating mode the transmitter 12 transmits a high frequency transmission signal S1 of a certain frequency, whose reflection generates a reflection signal at the object 34, which is called receiving signal E1. The receiving signal E1 is received by the transmitter 12 which also creates a receiver 14. Furthermore a part of the transmission signal S1 is transmitted by the object 34. This part generates a transmission signal, which is received by the receiver 14 and is called receiving signal E2.

Figure 2:
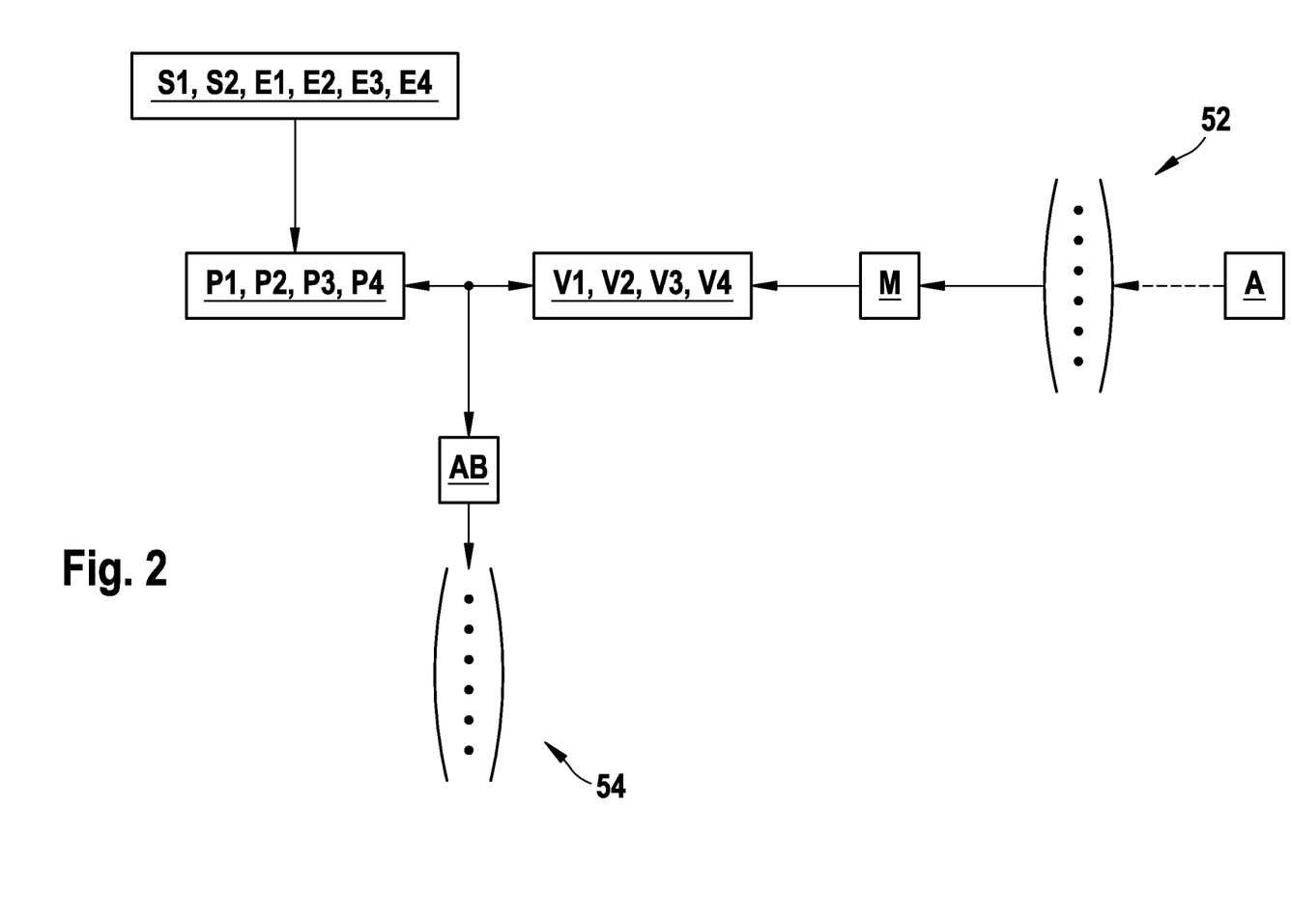

The analysis unit 16 calculates a parameter P1 with the aid of the transmission signal S1 and the receiving signal E2, which is the transmission factor of the object 34 in the measuring position in a spreading direction of the transmission signal S1 (see also FIG. 2). The computer unit 10 is provided to compare the parameter P1 to a comparison parameter V1, which is a transmission factor of the object 34 in a model M and which calculates a software of the computer unit 10 by means of the model M. The model M models the object 34 as an accumulation of immediately consecutive cuboid and homogenous layers 22, 24 of which each layer 22, 24 borders directly at least two other layers 22, 24. The cuboid sides 36, 38 of adjacent layers 22, 24 are hereby directly adjacent at a surface of a non-vanishing size. For calculating the comparison parameter V1 the model M required a characteristic vector 52, which contains several parameters (FIG. 2). A first parameter is for example the number of layers 22, 24, with whose aid the model M models the object 34. Further parameters of the model M are for example the thicknesses 18, 20 of these layers 22, 24 and their di-electricity constants. The parameters are either familiar and can be entered by an operator or they are unknown parameters or parameters that have to be determined, which are for example assumed at the implementation of a calculation by means of the model. It is furthermore assumed that all points of a wave front of the signal, which hit one of the layers 22, 24, simultaneously hit one of them. With those assumptions the Maxwell equations in the accumulation of the layers 22, 24 and in the adjoining area can be solved, so that the computer unit 10 can calculate the comparison parameter V1 with the characteristic vector 52. That way the comparison parameter V1 is assigned to the characteristic vector 52.

The software is furthermore provided to determine a value of the comparison parameter V1, which realizes a minimal deviation AB of the comparison parameter V1 from the parameter P1. The computer unit 10 calculates therefore values of the comparison parameter V1 for different value combinations of values of the individual parameters with the aid of the software. Optionally a user A can be appointed with familiar parameters by the user A over an input unit 26 in the model M. The software calculates the corresponding comparison parameter V1 for each value combination and finds the optimal value combination, for which the associated comparison parameter V1 has a lowest deviation AB from the parameter P1 that has been calculated by the analysis unit 16 compared to the calculated comparison parameter V1 of the other value combination. The optimal value combination creates an optimal characteristic vector 54. The determination of the minimal deviation can for example be carried out by varying the number of layers, which are assumed by the model M. from the characteristic vector 54, which corresponds with the minimal deviation, the actual number of layers can be read out. If the number of layers is familiar to the user A, he can enter the number. Thereby the precision of the determination of further physical parameters of the object 34, as for example the thickness of layers, is increased.

In a further operating mode additional information for determining the optimal characteristic vector 54 are used. Therefore parameter P1 and parameter P2, which is also a transmission factor, are calculated by the analysis unit 16 for the transmission signal S1 and a transmission signal S2, which is transmitted by the receiver 14, and parameters P3 and P4, which are reflection factors, are calculated by the analysis unit 16 with the aid of reflection signals, which generate the receiving signals E1, E3. During the reception of the receiving signal E1 the transmitter 12 functions as receiver. The transmission signal S2 proceeds from the receiver 14, is modified by the object 34 and subsequently received by the transmitter 12 as receiving signal E4. In this operating mode further comparison parameters V2, V3, V4 are calculated with the aid of the model M analogously to the already described calculation of the comparison parameter V1, whereby the comparison parameter V2 is a transmission factor for the transmission signal S2. The comparison parameters V3 and V4 are reflection factors for the transmission signals S and S2. The comparison parameters V1, V2, V3, V4 that have been calculated by the computer unit 10 with the aid of the model 10 are compared to the parameters P1 to P4 that have been calculated by the analysis unit 16 and the square error is calculated for the individual factors and added to a total error. The computer unit 10 determines the characteristic vector 54, which provides a minimal total error in comparison to the other user characteristic vectors 52 and therefore a minimal deviation AB. Principally other procedures or algorithms are also possible in order to find a characteristic vector 54 with a minimal total error.

The device 30 offers further possibilities to determine whether the object has two or more layers 22, 24. Therefore the software is provided to distinguish at least two parameter areas due to a magnitude of error that has been calculated by the model M. It can be distinguished by the calculated error in particular between a first situation, in which the object 34 provides only one layer, and a second situation, in which the object 34 provides at least two layers. It is assumed in the example that is shown in FIG. 1, at which the object 34 provides the two layers 22, 24, that the user A enters the number of layers "one" with the aid of the input unit 26. Subsequently the total error is determined by means of the model M. At the object 34, which provides two layers 22, 24, the total error exceeds a threshold, so that the software concludes that the object 34 consists of at least two layers 22, 24.

Figure 3:
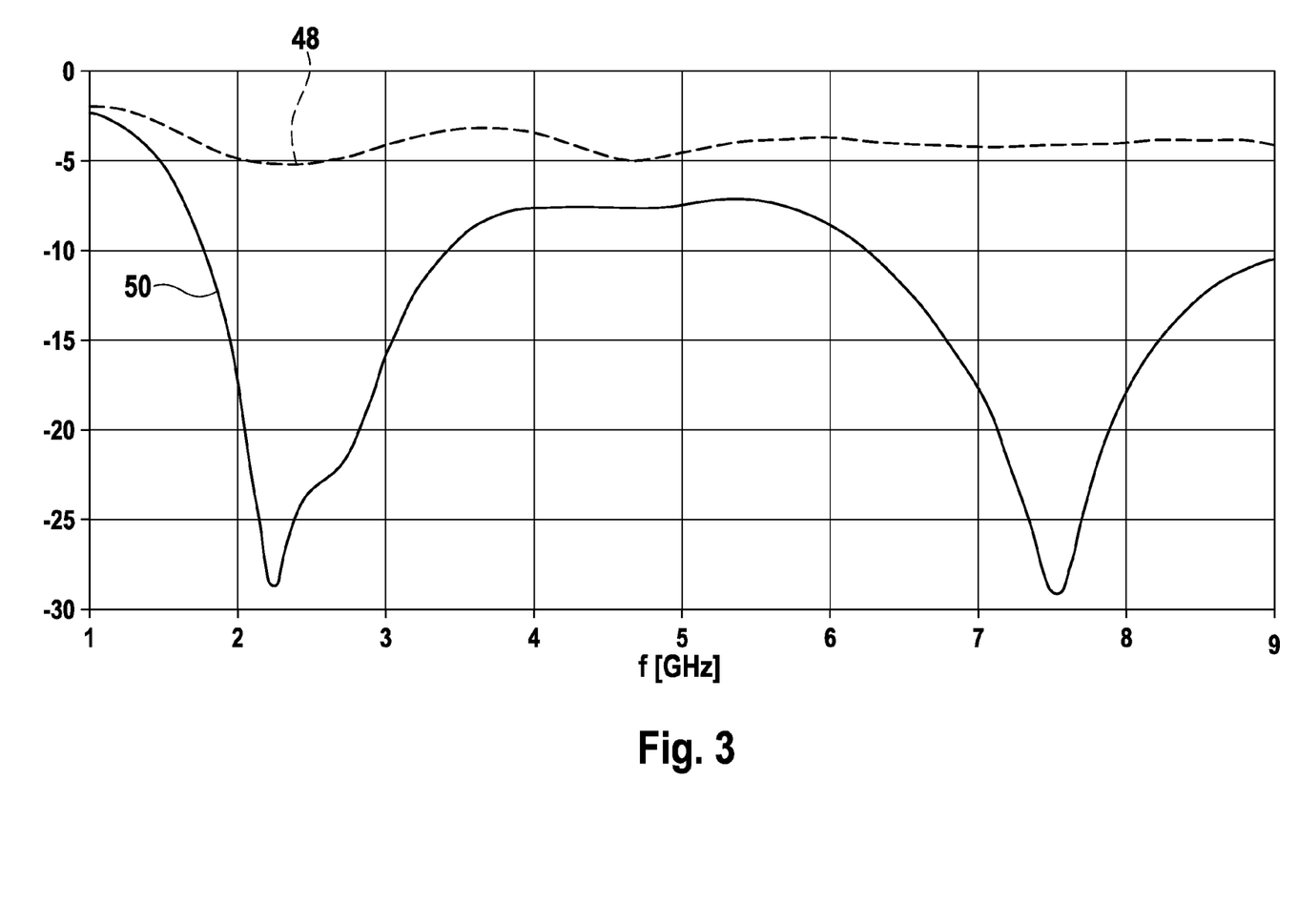

A further possibility is the comparison of reflection factors. If a reflection factor, for whose calculation the transmission signal S1 has been used that is transmitted by the transmitter 12, deviates from a reflection factor (FIG. 3), for whose calculation the transmission signal S2 has been used, which is transmitted by the receiver 14 and which has the same frequency as the transmission signal S1 that has been transmitted by the transmitter 12, the object provides at least two layers 22, 24. FIG. 3 shows therefore the logarithmic relation of the amount of two reflection factors in relation to a reference constant for different frequencies of the transmission signal, whereby the layer 22 consists in that case of human tissue and the layer 24 of wood. The transmitter 12 transmits the transmission signal S1 for a curve 48, for a curve 50 the receiver 14 sends out a transmission signal S2.

In addition to the two already described operating modes the device 30 has four further operating modes. In a third operating mode only one of the parameters P3, P4, which are both reflection coefficients, are compared to the associated comparison parameter V3 or V4, in order to calculate the total error. In a further operating mode the parameters P3 and P4 are compared to the comparison parameters V3 and V4 for calculating the total error. One of the parameters P3, P4 and one of the Parameters P1, P2 are compared to the associated comparison parameter V3 or V4 and V1 and V2 in a fifth operating mode, in order to determine the optimal characteristic vector 54. In a further operating mode the parameters P3 and P4 and one of the parameters P1, P2 are compared to the corresponding comparison parameters V3, V4 and V1 or V2 for determining the total error.

Figure 4:
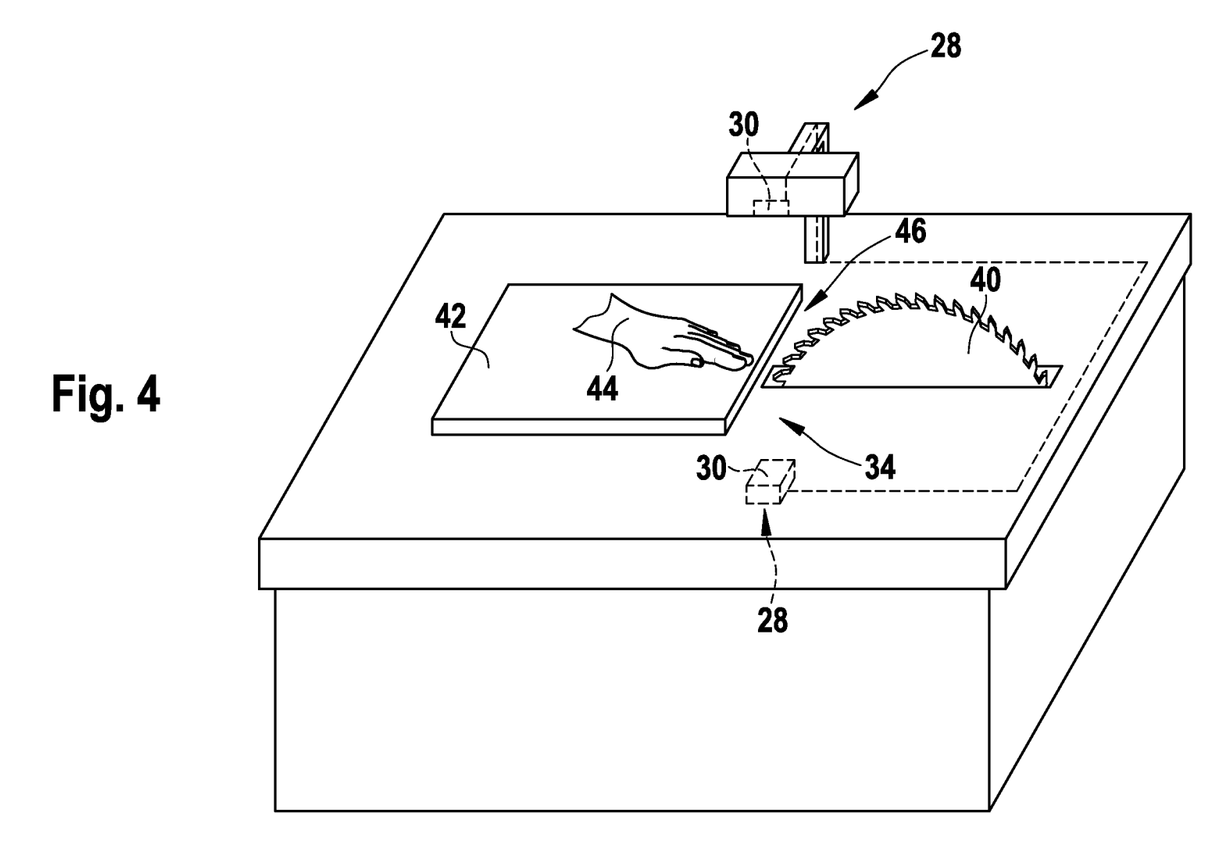

FIG. 4 shows a machine tool device with a machine tool 40 that is construed as a circular saw and a protective sensor system 28, which provides the device 30. For cutting the wooden panel 42 it is manually moved towards the machine tool 40. Due to the device 30 in particular a danger zone 46, which is arranged immediately next to the machine tool 40, is controlled. With the aid of the above described measuring and calculating procedure the presence of human tissue in the danger zone 46 can be detected by the device 30. If a hand 44 is moved into the danger zone 46 it is detected by the device 30 and a safety measure is undertaken as a result. Therefore the protective sensor system 28 has an interaction connection with the actuator unit, which is provided for the implementation of a safety measure. When detecting a danger situation by the actuator unit an operation of the machine tool 40 can for example be stopped. In another embodiment the machine tool 40 can be driven in to an inaccessible position for the user or the machine tool 40 can be covered by a protective device.

The invention claimed is:

1. A machine tool device, having at least one computer, at least one transmitter for transmitting a transmission signal, at least one receiver for receiving at least one receiving signal excited by the transmission signal, and at least one analysis unit which is provided to calculate at least one parameter by means of the receiving signal wherein the computer unit is provided to compare the parameter to at least one comparison parameter calculated by means of at least one model, wherein the machine tool is used to work on a work piece, and wherein comparing the parameter to the at least one comparison parameter can be used to determine the thickness of a layer of the work piece and to detect the presence of an object other than the work piece.

2. The machine tool device according to claim 1 wherein the parameter is a reflection variable or a transmission variable.

3. The machine tool device according to claim 1, wherein the comparison parameter is assigned to at least one characteristic vector of the model.

4. The machine tool device according to claim 3 wherein the characteristic vector provides at least a thickness of a layer whose interaction is described with the transmission signal with the aid of the model.

5. The machine tool device according to claim 3, wherein the characteristic vector comprises at least one di-electricity constant of a layer whose interaction is described by the transmission signal with the aid of the model.

6. The machine tool device according to claim 3, wherein the characteristic vector provides at least a number of layers which indicates the number of layers of an object that is examined with the aid of the transmission signal, which is incorporated in the calculation by means of the model.

7. The machine tool device according to claim 1, wherein the computer provides software, which is provided to calculate the comparison parameter by means of the model.

8. The machine tool device according to claim 7 wherein an input unit for putting in at least one characteristic variable, which is used by the software as input value for calculating the comparison parameter.

9. The machine tool device according to claim 7, wherein the software is provided to determine a value of the comparison parameter, which realizes a minimal deviation of the comparison parameter from the parameter.

10. The machine tool device according to claim 7, wherein the software is provided to distinguish at least two characteristic variable areas of a magnitude of error that has been calculated by means of the model.

11. The machine tool device according to claim 1, wherein the transmission signal is a high frequency signal.

12. Protective sensor system with a machine tool device according to claim 1.

13. Procedure for use with a machine tool device according to claim 1, wherein at least one transmission signal is transmitted, at least one receiving signal that has been excited by the transmission signal is received, one parameter is calculated at least by means of the receiving signal and the parameter is compared with at least one comparison parameter that has been calculated by means of a model.

14. The procedure of claim 13 further comprising the step of stopping a cutting element of a machine tool when comparing the parameter to the at least one comparison parameter indicates the presence of an object other than a work piece.

15. A safety device for detecting objects in a danger zone of a machine tool, the safety device comprising:
  a computer;
  a transmitter for transmitting a first signal into the danger zone;
  a receiver for receiving a second signal from the danger zone excited by the first signal; and
  an analysis unit,
  wherein the machine tool is used to operate on a work piece, and wherein the analysis unit calculates at least one measurement parameter using the second signal, and wherein the computer compares the at least one measurement parameter to a comparison parameter to determine the presence of an object other than the work piece in the danger zone; and wherein the comparison parameter relates to the thickness of a layer of the work piece and is calculated by means of a model.

16. The safety device of claim 15 wherein the at least one measurement parameter can be used to measure variations in the accumulation of layers.

17. The safety device of claim 16 wherein an increase in the accumulation of layers can indicate the presence of an object other than the work piece in the danger zone.

18. The safety device of claim 15 wherein the model uses Maxwell equations to calculate the accumulation of layers of the work piece.

\* \* \* \* \*

UNITED STATES PATENT AND TRADEMARK OFFICE
CERTIFICATE OF CORRECTION

PATENT NO. : 8,670,844 B2  
APPLICATION NO. : 12/811960  
DATED : March 11, 2014  
INVENTOR(S) : Krapf et al.

Page 1 of 1

It is certified that error appears in the above-identified patent and that said Letters Patent is hereby corrected as shown below:

On Title Page Item (75)

Please delete "Michael Mahler, Lenfelden-Echterdingen (DE);"

and insert --Michael Mahler, Leinfelden-Echterdingen (DE);-- in its place.

Signed and Sealed this  
Second Day of December, 2014

Michelle K. Lee  
*Deputy Director of the United States Patent and Trademark Office*